United States Patent [19]

Denree et al.

[11] Patent Number: 4,657,119
[45] Date of Patent: Apr. 14, 1987

[54] DEVICE FOR ATTACHING A COMPONENT OF A STRUT INCORPORATING AN AUTOMATIC ADJUSTMENT DEVICE FOR A SHOE OF A DRUM BRAKE

[75] Inventors: Michel Denree, Aulnay-sous-Bois; Jean-Yves Michaud, La Courneuve, both of France

[73] Assignee: Societe Anonyme D.B.A., Paris, France

[21] Appl. No.: 874,881

[22] Filed: Jun. 16, 1986

Related U.S. Application Data

[63] Continuation of Ser. No. 669,559, Nov. 8, 1984, abandoned.

[30] Foreign Application Priority Data

Nov. 21, 1983 [FR] France ................. 83 18489

[51] Int. Cl.$^4$ .................... F16D 51/18; F16D 65/00; F16D 65/52
[52] U.S. Cl. ................ 188/79.5 R; 188/205 A; 188/250 A; 188/250 D; 188/250 E; 403/326; 411/522
[58] Field of Search ............ 188/79.5, 196, 327–330, 188/205 A, 335, 78, 250, 206, 77, 73, 38, 106 A; 192/111 A, 110 R, 110 B; 403/326, 155, 329, 330, 327, 328; 267/158–164; 24/458, 542, 543, 531, 573, 336, 555, 545; 411/517, 522, 353, 121

[56] References Cited

U.S. PATENT DOCUMENTS

| | | | |
|---|---|---|---|
| 1,550,399 | 8/1925 | Stoner | 188/250 A X |
| 1,821,149 | 9/1931 | Gallup | 188/250 R X |
| 1,909,353 | 5/1933 | Hughes et al. | 403/326 |
| 3,195,690 | 7/1965 | Johannesen et al. | 188/250 A X |
| 3,326,580 | 6/1967 | Munier et al. | 411/517 X |
| 3,570,632 | 3/1971 | Williams | 188/79.5 R |
| 4,101,010 | 7/1978 | Burnett | 188/79.5 P |
| 4,117,910 | 10/1978 | Johannesen | 188/196 BA X |
| 4,167,990 | 9/1979 | Steer et al. | 188/205 A |
| 4,174,770 | 11/1979 | Courbot | 188/196 BA X |
| 4,182,439 | 1/1980 | Kluger et al. | 188/205 A X |
| 4,280,597 | 7/1981 | Schorwerth | 403/155 X |
| 4,352,586 | 10/1982 | Hayden | 411/353 X |
| 4,375,252 | 3/1983 | Aono et al. | 188/205 A X |
| 4,421,211 | 12/1983 | Hoffman et al. | 403/326 X |
| 4,456,103 | 6/1984 | Muscat | 188/79.5 GE X |
| 4,470,486 | 9/1984 | Spitler | 188/79.5 P |
| 4,476,673 | 10/1984 | Brown | 411/121 X |
| 4,503,949 | 3/1985 | Carré et al. | 188/79.5 P |
| 4,503,953 | 3/1985 | Majewski | 403/155 X |
| 4,553,649 | 11/1985 | Bailey et al. | 188/205 A X |

FOREIGN PATENT DOCUMENTS

| | | | |
|---|---|---|---|
| 210678 | 8/1960 | Austria | 411/517 |
| 1005855 | 4/1957 | Fed. Rep. of Germany . | |
| 2951607 | 1/1981 | Fed. Rep. of Germany | 188/250 R |
| 1066843 | 1/1954 | France | 411/517 |
| 2023300 | 11/1969 | France . | |
| 2386734 | 11/1978 | France . | |
| 2404766 | 4/1979 | France . | |
| 2417037 | 9/1979 | France . | |
| 2514847 | 4/1983 | France . | |
| 0031533 | 3/1981 | Japan | 188/250 D |

Primary Examiner—Douglas C. Butler
Attorney, Agent, or Firm—Larry J. Palguta; Ken C. Decker

[57] ABSTRACT

The attachment device incorporates a bearing zone (78) and a projection (80) formed in the web (16) of a shoe of a drum brake. A portion (68) of the component (46) to be attached to the shoe is retained in a working position between the bearing zone (78) and the projection (80) by a spring (82).

5 Claims, 9 Drawing Figures

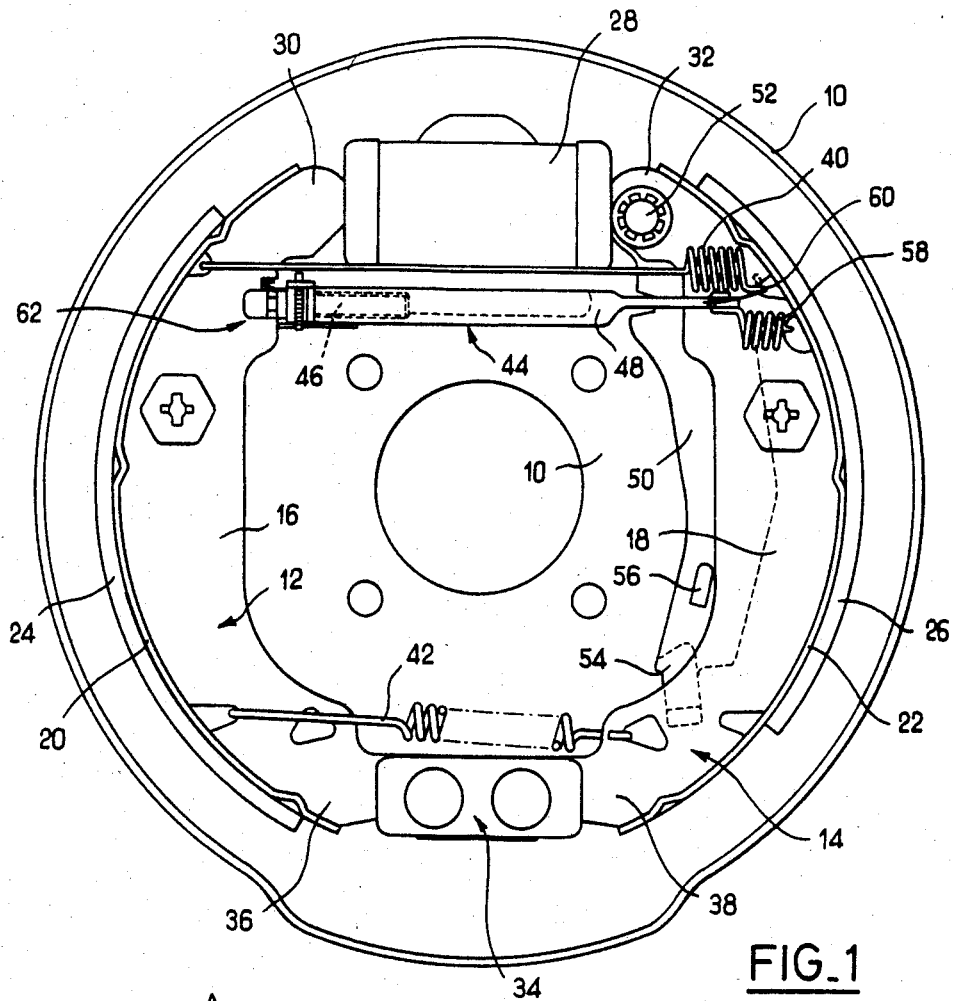
FIG_1
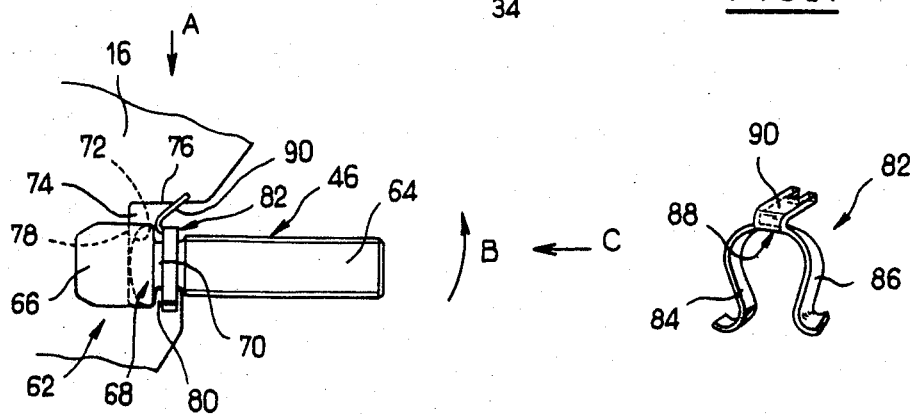
FIG_2
FIG_3

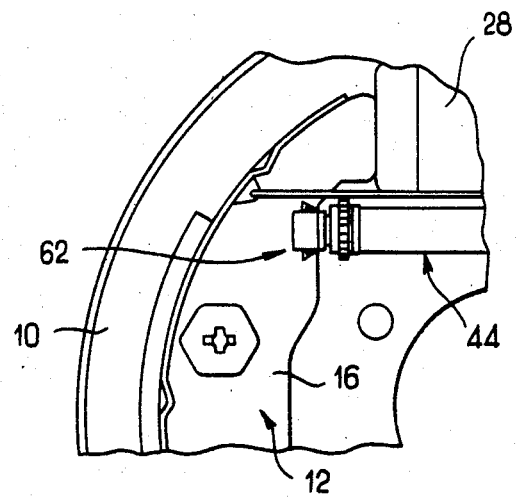
FIG_4
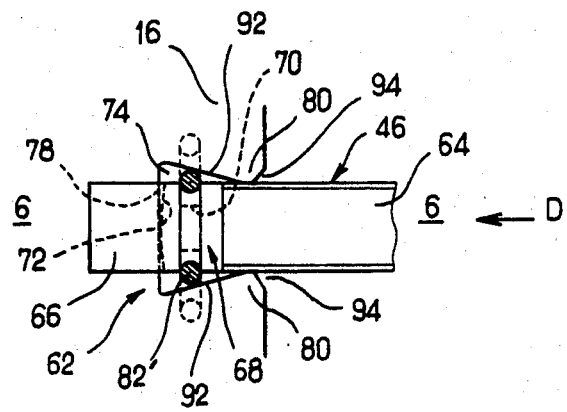
FIG_5
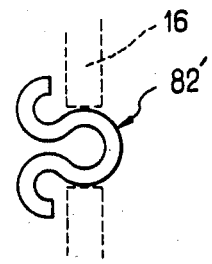
FIG_7
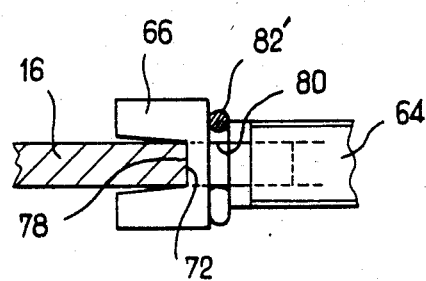
FIG_6

DEVICE FOR ATTACHING A COMPONENT OF A STRUT INCORPORATING AN AUTOMATIC ADJUSTMENT DEVICE FOR A SHOE OF A DRUM BRAKE

This is a continuation of application Ser. No. 669,559 filed Nov. 8, 1984, now abandoned.

The invention concerns a device for attaching a strut of a drum brake, in particular, for use on motor vehicles.

The invention particularly concerns a device for attaching a component of a strut incorporating an automatic adjustment device for a shoe of a drum brake.

A number of drum brakes are known which are equipped with automatic adjustment devices joined to a strut, whose elongation is automatically controlled to compensate for the wear of the friction components. Among this type of brake, there are some which require that the parts of the strut in contact with the corresponding shoes must follow the movement of these shoes to enable the automatic adjustment to operate. An example is given in French Patent Application 81-19,575 filed under publication FR-A-2,514,847 which describes such a strut with automatic adjustment. It is always possible, as indicated in the Patent Application mentioned above, to provide springs in position between the shoes and the corresponding component of the strut in order to ensure that the latter effectively follows the movements of the shoe. Although this solution meets the problem posed, it requires, firstly, a spring to be placed in position after mounting the strut onto the brake, and secondly, this spring must have sufficient stiffness, thus making the latter difficult to mount, to ensure simultaneous movement of the component of the strut and of the corresponding shoe. It will also be noted that attaching such a spring to the strut component close to the control ratchet may cause damage to the latter, and thus render the automatic adjustment inoperative.

The invention proposes a device for attaching a strut to the brake shoes, ensuring simultaneous movement of the strut component and of the corresponding shoe, and not possessing the disadvantage mentioned above.

Accordingly, the invention proposes a device for attaching a component of a strut, incorporating an automatic adjustment device, to a shoe of a drum brake, characterized in that the device is formed by a portion of the component retained by means of an elastic component in an operating position between a bearing zone and a projection firmly fixed to the shoe, said elastic component acting generally transversely to said component.

It is clear that owing to these characteristics the strut component is retained between two abutments formed on the shoe, the elastic component only retaining the strut between these two abutments. It is therefore not necessary that this elastic component be very stiff as the forces between the strut component and the shoe do not pass through this spring.

According to another characteristic of the invention, the elastic component is firmly fixed to the said component of the strut.

According to another characteristic of the invention, a portion of the return spring of the shoes provides the function of the elastic component.

Three embodiments of the invention are described below, by way of examples which are not limiting, with reference to the accompanying drawings, in which:

FIG. 1 is a plan view of a drum brake constructed in accordance with the present invention;

FIG. 2 is a partial enlarged view of the device for attaching the strut shown in FIG. 1;

FIG. 3 shows the elastic component of the attachment device shown in FIG. 2;

FIG. 4 is a partial view similar to that of FIG. 1 showing an attachment device according to a second embodiment;

FIG. 5 is an enlarged view of the attachment device shown in FIG. 4;

FIG. 6 is a view in partial section along the line 6—6 shown in FIG. 5;

FIG. 7 is a reduced scale view of the elastic component shown in FIGS. 5 and 6;

Figure 8:
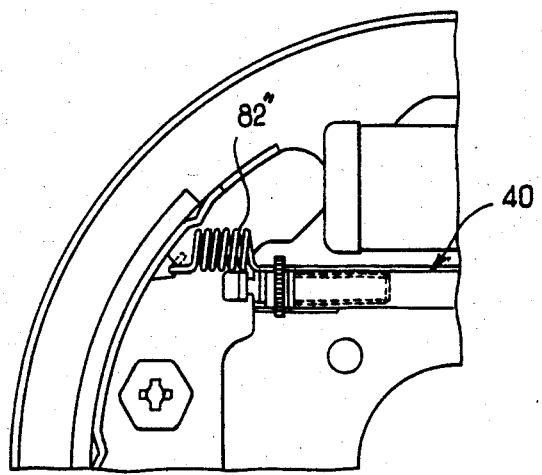
FIG. 8 is a partial view similar to that of FIG. 1, showing a third embodiment of the invention.

The drum brake shown in FIG. 1 incorporates a back plate 10 intended to be joined to a fixed portion of the vehicle (not shown) and on which two brake shoes 12 and 14 are slideably mounted. Each of the shoes 12 and 14 incorporates a web 16, 18 which is essentially flat, and a curved rim 20, 22 on which a friction component 24, 26, respectively, is mounted, by means of rivets or similar means. Means for applying the brake, consisting in the embodiment shown of a wheel cylinder 28, are positioned between the first two adjacent ends 30 and 32 of the shoes 12 and 14 respectively, and an anchor block 34, joined to the back plate 10 is positioned between the other two ends 36 and 38 of the shoes 12 and 14. In addition, return springs 40 and 42 are positioned in the region of the wheel cylinder 28 and of the anchor block 34, respectively, so as to push the ends 30 and 32 of the shoes against the wheel cylinder 28, and the ends 36 and 38 of the shoes against the anchor block 34, respectively. A strut 44 is positioned between the shoes 12 and 14 in the region of the wheel cylinder 28 so as to define a distance separating the ends 30 and 32 of the shoes when at rest. The strut 44 incorporates a device for automatic adjustment of the type described in French Patent Application FR-A-publication 2,524,847 and will not be described here in greater detail. The strut 44 incorporates two components 46 and 48 which follow the movement of the shoes 12 and 14, respectively. In the embodiment shown, the drum brake is equipped with a mechanical control constructed by means of a lever 50 articulated at one end by means of a shaft forming a pivot 52 onto the end 32 of the shoe 14. Its other end 54 is intended to be joined to a control cable joined to a lever situated in the driving compartment of the vehicle (not shown). This lever 50 incorporates a projection 56 which bears against the edge of the web 18 of the shoe 14 so as to define the rest position of this lever. The strut 44, and more precisely its component 48, bears against the lever 50, due to the return spring of the shoes 40. A return spring 58 for the handbrake lever 50 is mounted between the web 18 of the shoe 14 and an extension 60 of the component 48 of the strut 44.

In accordance with the invention, the component 46 is attached to the shoe 12 by means of an attachment device, designated as an assembly by the reference 62. Referring to FIG. 2, it may be seen that the component 46 incorporates an extended threaded body 64 joined to a fork 66, passing both sides of the web 16 and of the shoe 12, by a portion 68 incorporating, in the embodiment shown, a groove 70 and a bottom 72 of the fork 66. The web 16 or the shoe 12 has a recess 74 incorporating a portion 76 essentially parallel to the axis of the body 64 of the component 46, a bottom of the recess 78 essentially perpendicular to the axis of the body 64, and a projection 80 which enters into the groove 70 of the portion 68. As may be seen in FIG. 2, the portion 68 is positioned between the bottom 78 of the recess 74 forming a bearing zone and a projection 80, thus retaining axially the component 46 relative to the web 16, that is to say relative to the shoe 12. In order that the component 46 shall remain in its operating position, it is retained in this position by a spring 82 forming an elastic component, positioned between the portion 68 and, more precisely, the groove 70 and the portion 76 of the recess 74, thus exerting a force in the direction of the arrow A, shown in FIG. 2, i.e. generally transversely to the component 46, on the portion 68 and retaining it in the operating position. As may be seen in FIGS. 2 and 3, the spring 82 incorporates two arms 84 and 86 lying in the groove 70 whose free ends terminate close to the projection 80 and each side thereof. These two arms 84 and 86 are joined together by a body 88 which extends into a third arm 90 folded back so as to come to bear against the portion 76 of the recess 74. The two arms 84 and 86 thus forming an orientating portion of the spring 82 ensuring the correct positioning of the third arm 90 relative to the portion 76 of the recess 74. As may be seen in FIG. 2, the distance between the projection 80 and the portion 76 of the recess 74 is slightly greater than the dimensions of the component 46 in the region of this projection, that is to say slightly greater than the size of the portion 68, so as to be able to introduce axially the portion 68 between the projection 80 and the portion 76.

When attaching the strut 44 onto the shoe 12, two different procedures may be followed: either the component 46 is offered obliquely so as to first make the projection 80 enter into the groove 70 passing between the arms 84 and 86 of the spring 82, then tilting the component 46 in the direction of the arrow B thus compressing the spring 82, and more precisely, the third arm 90 which is to retain the portion 68 in the operating position. Alternatively the component 46 may be offered in the direction of arrow C shown in FIG. 2 so that it passes between the projection 80 and the portion 76, thereby compressing the third arm 90 of the spring 82. When the bottom 72 of the fork 66 has reached the bottom 78 of the recess 74, the spring 82, pushing back the component 46 in the direction of the arrow A, causes it to occupy the operating position, in which position it is retained by the spring.

FIGS. 4 to 7 show a second embodiment in which the components fulfulling the same function carry the same reference numbers.

In this embodiment, the portion 68 incorporates a groove 70 in which is mounted, without appreciable axial play, a spring 82' made, in the example shown, of round wire of diameter slightly less than the width of the groove 70. The groove 70 has a depth greater than the diameter of the wire of the spring 82'. The web 16 of the shoe 12 has a recess 74 incorporating a bottom 78 essentially perpendicular to the axis of the body 64, and two projections 80 whose distance apart is slightly greater than the dimension of the portion 68 and of the body 64. The projections 80 extend towards the bottom 78 gradually becoming more distant from the axis of the body 64, the length of the bottom 78 being greater than the distance between the two projections 80. These inclined extensions of the projections 80 define two inclined edges 92, becoming closer together gradually as the distance from the bottom 78 increases. The recess 74 also has, on the side remote from the rim 20, two entry chamfers 94. Referring to FIG. 7, it may be seen that the spring 82' has two free ends which are offset relative to the center of the circular portion, which is to be mounted in the groove 70, so that the spring 82' does not turn relative to the web 16 of the shoe 12 shown dotted in FIG. 7.

To mount the strut 44 onto the shoe 12 and, more precisely, to mount the component 46 onto the web 16, the portion 68 is fitted beforehand with the spring 82', and the component 64 is offered, in the direction of the arrow D shown in FIG. 5, so as to face the recess 74. The component 46 is introduced between the projections 80 until the spring 82' comes to bear against the chamfers 94. An additional force in the direction of the arrow D pushes down the spring 82' inside the groove 70 and allows the component 46 to pass between the projections 80. An additional push in the direction of the arrow D, until the bottom of the fork 72 comes to bear against the bottom 78 of the recess 74, allows the spring 82' partially to leave the groove 70 and to come into elastic co-operation with the inclined edges 92 of the recess 74, the spring 82' acting generally transversely to the component 46. In this way, the portion 60 is retained elastically by the spring 82' between the bearing zone 78 and the projections 80, or more precisely the edges 92 of the projections 80, thus prevent the component 46 from becoming detached from the web 16. In fact, to extract the component 46 from the shoe 12, the force which is required to cause the spring 82', or more precisely the two diametrically opposed portions of the latter, to enter fully into the groove 70, must be overcome. The portion 68 of the component 46 is thus retained in the operating position, between the bearing zone formed by the bottom 78 of the recess 74 and the inclined edges 92 of the projections 80.

Figure 9:
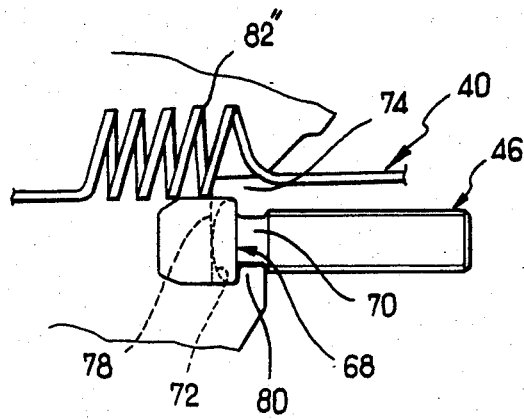
FIG. 9 is a partial enlarged view of the attachment shown in FIG. 8.

FIGS. 8 and 9 show a third embodiment of the invention in which the components fulfilling the same functions carry the same reference numbers.

In this third embodiment which is very close in its construction to the first embodiment, the elastic component retaining the portion 68 in the operating position is formed by a portion 82" of the return spring 40 for the shoes. As may be seen in FIGS. 8 and 9, the spring 40 has a coiled portion 82" which comes to beat upon the portion 68 of the component 46, retaining the latter between the bottom 78 of the notch 74 and the projection 80. Mounting is carried out in a manner similar to that of the first embodiment with the essential difference that the component 46 will only be retained in the operating position, between the bottom 78 and the projection 80, after mounting the return spring 40 for the shoes, the spring 40 will act generally transversely to the component 46.

It is clear that the invention is not limited to the embodiments shown, in particular, if the brake does not incorporate a mechanical control, the strut 44 may incorporate two similar attachment devices on each of its components 46 and 48. In fact, in the embodiment shown, the presence of the mechanical control requires a return spring 58 for the lever 50 and it is advantageous to use this same spring to attach the component 48 to the shoe through the lever 50.

Modifications to the attachment device may also be considered, for example concerning the shape of the recesses or the shape of the retaining springs, without departing from the framework of the present invention.

We claim:

1. A device for attaching a component of an adjustable strut to a shoe of a drum brake, the adjustable strut comprising an automatic adjustment device that operates as a function of brake friction lining wear, the shoe having a circumferentially extending web with a recess formed therein, the recess having a bearing zone and a projection extending adjacent an opening of the recess, said component comprising a portion having a groove adjacent an end of the portion, the portion disposed in an operating position in said recess between the bearing zone and projection with the projection extending into the groove to immobilize the component relative to the web so that axial loading imposed upon said strut is transmitted directly to the web, the portion maintained in said operating position by means of an elastic member than engages and exerts on the component a transverse biasing force that biases the portion in a circumferential direction relative to said brake and into engagement with the projection, the elastic member disposed between the shoe and portion so as to exert said transverse biasing force to maintain the strut and web in a direct load-bearing relationship, the elastic member positioned within said recess between an edge of the recess and the portion, the elastic member comprising a resilient clip having three arms, two of said arms being a complementary shaped pair of arms received about said portion and within said groove, the third arm extending from said elastic member to engage said edge, and ends of the pair of arms engaging associated sides of said projection to maintain the elastic member in position relative to said web.

2. The device according to claim 1, wherein said component includes a fork extending on both sides of the web of said shoe and an extended body incorporating a thread, said portion being formed between said fork and extended body.

3. The device according to claim 2, wherein said portion includes a bottom of said fork positioned facing the bearing zone of said recess, the bearing zone forming a bottom of the recess.

4. The device according to claim 3, wherein said elastic member is firmly mounted upon and attached to said portion.

5. The device according to claim 4, wherein said elastic member bears upon the edge of the recess which lies essentially parallel to said component.

* * * * *